Figure 3:
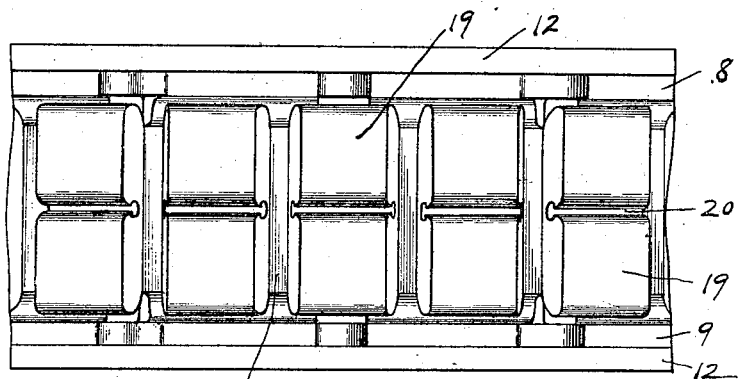
Figure 4:
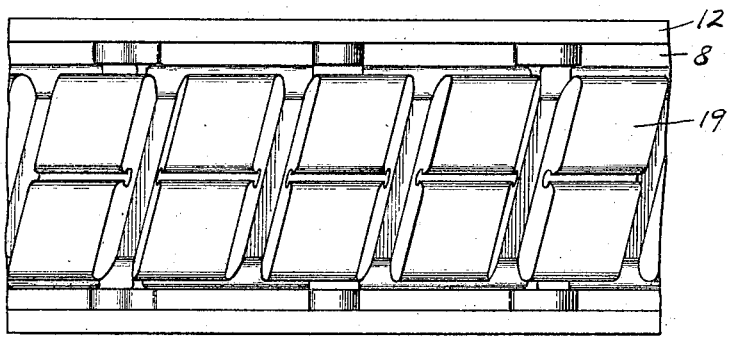
Figure 5:
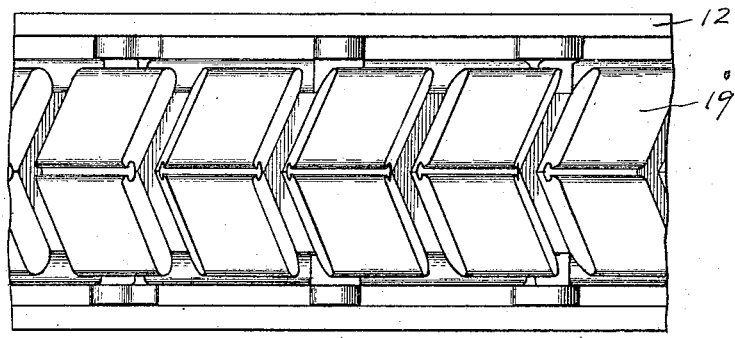

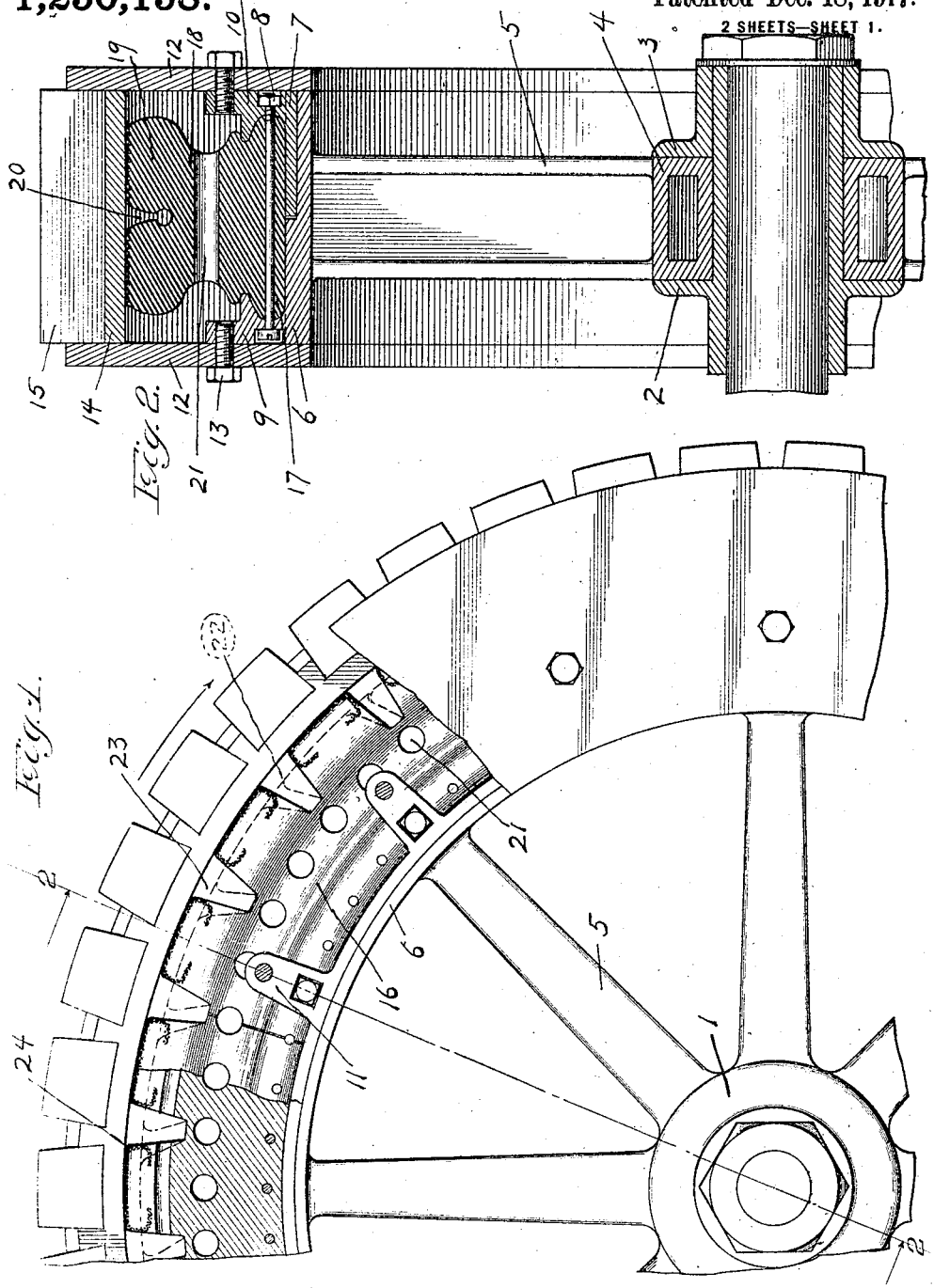
F. A. FROMMANN.
VEHICLE WHEEL.
APPLICATION FILED FEB. 12, 1913.
1,250,158.
Patented Dec. 18, 1917.
2 SHEETS—SHEET 1.
Witnesses:
R. C. Farrington
M. M. Boyle
Inventor
Franklin A. Frommann
by Lotz & Scheible
Attys.

UNITED STATES PATENT OFFICE.

FRANKLIN A. FROMMANN, OF CHICAGO, ILLINOIS.

VEHICLE-WHEEL.

1,250,158.

Specification of Letters Patent.

Patented Dec. 18, 1917.

Application filed February 12, 1913. Serial No. 747,925.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to wheels for heavy vehicles, such as automobile trucks and more particularly to the class of wheels in which one or more resilient members are interposed between the tire member of the wheel and an inner rim carried by the hub. The object of my invention is to provide an annular resilient member, or series of members, which may be easily secured to the inner rim of the wheel or detached therefrom; which will permit of a considerable peripheral motion of the tire relative to the rim member without sliding the resilient members relative to the tire; and which will have a friction-reducing surface upon the portion bearing against the inner surface of the tire.

Other objects will appear from the following specification and from the drawings, in which:

Figure —1— is a fragmentary side elevation of a wheel embodying my invention, with certain parts cut away.

Fig. —2— is a section through Fig. —1— along the line 2—2.

Fig. —3— is a partial plan view of the wheel portion shown in Fig. —1— with the tire member of the wheel removed.

Figs. —4— and —5— are similar views showing alternative forms of the cushioning members.

In the drawings, the hub 1 of the wheel has upon it an integral flange 2 facing a detachable flange 3, the said flanges having parallel faces opposed to each other and adapted to clamp a hollow member 4 between the same. Spokes 5, integral with the hollow member 4, are joined at their outer ends to a rim member 6 having a separable portion 7 adapted to be secured thereto by bolts 8 extending through flanges 9 and 10 extending radially outward from the rim members 6 and 7 respectively. The flanges 9 and 10 have grooved formations facing each other and also have lugs 11 extending radially outward at intervals along the periphery of the wheel. Annular side flanges 12, secured to the lugs 11 by bolts 13, extend radially outward from the rim members and act as lateral guides for the tire of the wheel. The tire member preferably consists of an annular member 14 having a plurality of detachable tread blocks 15 mounted thereon, as more fully shown in my copending applications, Serial Nos. 735721 and 734876.

Interposed in annular formation between the rim member (consisting of the adjoined portions 6 and 7) and the annular portion 14 of the tire member, are a series of resilient members 16, preferably made of vulcanized rubber, having laterally extending base portions 17 adapted to be clampingly engaged between the aforesaid grooved formations upon the flanges 9 and 10. Each of the resilient members 16 has a laterally narrowed portion 18 connecting the base portion 17 with wider lug portions adapted to bear centrifugally against the tire member 14, each of these lug portions being divided by circumferential channels 20 into lobes 19.

The narrowed shank 18 of the resilient member preferably has cylindrical perforations 21 which may be flattened to substantially oval sections when the resilient member is compressed, thereby permitting of a greater distortion of the latter than would be possible if its shank were solid. To reduce the friction between the lobes of the resilient member and the inner surface of the tire, I preferably provide each of the said lobes with a covering 24 of textile material, such as canvas or duck secured to the lobe by having its ends molded into the rubber of the lobe.

It will be evident from the above that the tire member which is floatingly mounted upon the wheel, cannot only move radially with respect to the rim and hub members, but can also move circumferentially of the latter either by slipping upon the lobes of the resilient members or by distorting the latter, as shown in dotted lines at 22. Owing to the transverse openings 23 and the circumferential channels 20 between the lobes and the perforations 21 intermediate of the lobes and the base portions of the resilient member, this distortion may be carried to an extent which would not be possible with a similarly positioned cushioning member having no such openings, channels or perforations.

While I have shown and described certain types of clamping formation, and certain shapes of the resilient members, I do not wish to be limited to these or other particular details of my invention as herein disclosed, as it will be obvious that these could be varied considerably without departing from the spirit of my invention. For instance, instead of using duck or a similar textile material for the friction-altering covering 24, this covering may be made of any other material differing in adhesive and wearing quality from the material of which the body and the lobes of the resilient member are made. So also, instead of having the edges of the lug portions of the resilient member at right angles to the sides of the wheel, these edges may be diagonal to the sides of the wheel, as in Fig. —4— or arranged in V-shaped formation as in Fig. —5—.

I claim as my invention:

1. In a vehicle wheel, a hub member having a rim element, a tire element circumferentially movable with respect to said rim element, side flanges fast upon one of said elements and laterally guiding the other thereof: and a lobate resilient member fast upon one of said elements and presenting lobes frictionally engaging the other thereof, and a yielding tip covering for each lobe, said covering being interposed between the lobe and the element frictionally engaged thereby and formed integrally with said lobes, and said covering being of a material different in adhesive quality from the material of the lobe.

2. In a vehicle wheel, a hub member having a rim provided at its opposite edges with annularly disposed opposed formations for receiving the base of a resilient member: side flanges carried by the said rim: a tire laterally guided by the said flanges: and a lobate resilient member fast upon the rim and presenting lobes frictionally engaging the tire, the said resilient member having formations adapted to be clampingly engaged by the said opposed formations upon the rim, each lobe of the said resilient member having its peripheral face covered with a woven material different in adhesive quality from the material of which the lobe is made and each thereof divided circumferentially into a plurality of relatively short projections by relatively deep transverse grooves.

3. In a vehicle wheel, a hub member having a rim element, a rigid tire circumferentially movable with respect to said rim element, side flanges fast upon one of said elements and laterally guiding the other thereof; and a lobate resilient member fast upon said rim element and presenting lobes frictionally engaging the tire, the outer portion of each of said lobes being divided circumferentially into the transversely separate sections, flexible woven caps integrate with said lobes adapted to contact with the tire, said resilient member provided with a circumferential series of transverse openings extending from side to side and one thereof arranged below and midway between the ends of said sections.

In testimony whereof I have signed my name in presence of two subscribing witnesses.

FRANKLIN A. FROMMANN.

Witnesses:
R. W. Lotz,
M. M. Boyle.

Copies of this patent may be obtained for five cents each, by addressing the "Commissioner of Patents, Washington, D. C."